United States Patent
Tseng et al.

(10) Patent No.: US 8,188,840 B2
(45) Date of Patent: May 29, 2012

(54) AUTHENTICATING METHOD AND IDENTIFICATION SYSTEM

(75) Inventors: Yin-Hung Tseng, Chiayi (TW); Sheng-Chun Hsu, Tai-Tung Hsien (TW)

(73) Assignee: Userstar Information System Co., Ltd., Chiayi (TW)

( * ) Notice: Subject to any disclaimer, the term of this patent is extended or adjusted under 35 U.S.C. 154(b) by 879 days.

(21) Appl. No.: 12/234,410

(22) Filed: Sep. 19, 2008

(65) Prior Publication Data

US 2010/0073140 A1    Mar. 25, 2010

(51) Int. Cl.
*H04Q 5/22* (2006.01)
(52) U.S. Cl. ......... 340/10.3; 340/1.1; 340/5.1; 340/5.2; 340/5.21; 340/5.25; 340/10.1; 340/10.4; 235/382; 235/382.5; 235/385
(58) Field of Classification Search .............. 340/1.1, 340/5.1, 5.2, 5.21–5.25, 5.61, 5.84, 10.1, 340/10.3, 10.4, 10.41, 10.42, 10.51, 10.52, 340/539.1; 235/382, 382.5, 385, 451
See application file for complete search history.

(56) References Cited

U.S. PATENT DOCUMENTS

| | | | |
|---|---|---|---|
| 2006/0012473 A1* | 1/2006 | Bishop et al. | 340/539.1 |
| 2006/0197651 A1* | 9/2006 | Lee et al. | 340/5.61 |
| 2006/0273175 A1* | 12/2006 | Ota et al. | 235/451 |
| 2007/0052525 A1* | 3/2007 | Quan et al. | 340/10.4 |
| 2008/0169903 A1* | 7/2008 | Fein et al. | 340/5.84 |

FOREIGN PATENT DOCUMENTS

TW    200704103 A    1/2007

OTHER PUBLICATIONS

Specification for RFID Air Interface EPC Radio-Frequency Identify Protocols Class—1 Generation-2 UHF RFID Protocol for Communications at 860MHz-960MHz Version 1.0.9, EPC global Inc. Jan. 2005, 491 Nov. 7, 2000, Fig. 6.23; p. 9 introduction; pp. 44-45, section 6.3.2.9.

Search Report of TW Patent Application No. 097136848 dated Jan. 30, 2012.

* cited by examiner

*Primary Examiner* — George Bugg
*Assistant Examiner* — Sisay Yacob
(74) *Attorney, Agent, or Firm* — Stephen A. Bent; Foley & Lardner LLP

(57) ABSTRACT

An authenticating method includes enabling a transponder to receive a read request that contains an authentication code, enabling the transponder to extract the authentication code from the read request, enabling the transponder to generate and wirelessly transmit a reply signal that contains the authentication code, and enabling a reader to authenticate the transponder based on the authentication code contained in the reply signal. An identification system, which includes the transponder and the reader is also disclosed.

12 Claims, 6 Drawing Sheets

AUTHENTICATING METHOD AND IDENTIFICATION SYSTEM

BACKGROUND OF THE INVENTION

1. Field of the Invention

This invention relates to an authenticating method for authenticating a transponder, such as a radio frequency identification (RFID) tag, of an identification system.

2. Description of the Related Art

When a reader reads a radio frequency identification (RFID) tag, the RFID tag sends a unique identifier thereof back to the reader.

The aforementioned conventional RFID tag is disadvantageous in that, since the unique identifier thereof is fixed, a counterfeit thereof can be easily fabricated by simply eavesdropping on the reader.

SUMMARY OF THE INVENTION

Therefore, the main object of the present invention is to provide an authenticating method that can overcome the aforesaid drawback of the prior art.

Another object of the present invention is to provide an identification system that can overcome the aforesaid drawback of the prior art.

According to an aspect of the present invention, an authenticating method comprises enabling a transponder to receive a read request that contains an authentication code, enabling the transponder to extract the authentication code from the read request, and enabling the transponder to generate and wirelessly transmit a reply signal that contains the authentication code extracted thereby from the read request. The transponder is authenticated based on the authentication code contained in the reply signal transmitted thereby.

According to another aspect of the present invention, an identification system comprises a transponder. The transponder receives a read request that contains an authentication code, extracts the authentication code from the read request, and generates and wirelessly transmits a reply signal that contains the authentication code extracted thereby from the read request. The transponder is authenticated based on the authentication code contained in the reply signal transmitted thereby.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
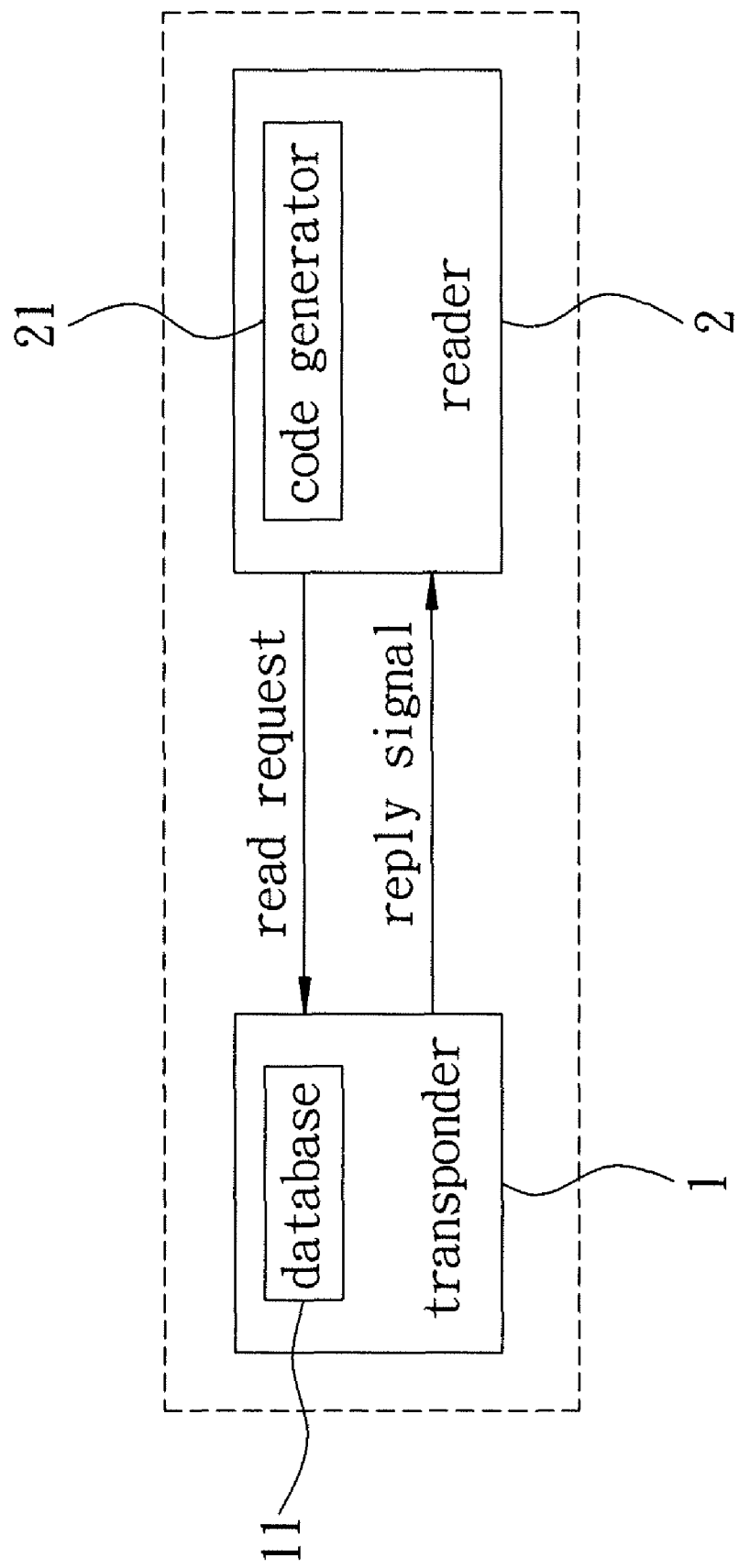
FIG. 1 is a block diagram of the first preferred embodiment of an identification system according to this invention.

Before the present invention is described in greater detail, it should be noted that like elements are denoted by the same reference numerals throughout the disclosure.

Referring to FIG. 1, the first preferred embodiment of an identification system according to this invention is shown to include a transponder 1 and a reader 2.

The transponder 1, such as a radio frequency identification (RFID) tag, includes a database 11 in which a unique identifier thereof is stored.

The reader 2 includes a code generator 21 that generates first and second authentication codes. In this embodiment, the reader 2 authenticates the transponder 1 based on the first and second authentication codes generated by the code generator 21 thereof, in a manner that will be described hereinafter.

The reader 2 generates and wirelessly transmits a read request that contains the first authentication code.

In this embodiment, the code generator 21 of the reader 2 generates the first authentication code based on a first varying value. Preferably, the first varying value is the date and time at which the code generator 21 of the reader 2 generates the first authentication code. For example, when the code generator 21 of the reader 2 generates the first varying value on Jul. 15, 2008 at 11:07:08 am, the first varying value may be 20080715110708.

The transponder 1 receives the read request, extracts the first authentication code from the read request, and generates and wirelessly transmits a reply signal that contains the first authentication code extracted thereby from the read request and the unique identifier of the transponder 1.

The reader 2 receives the reply signal, extracts the first authentication code and the unique identifier of the transponder 1 from the reply signal, and obtains a difference between the first authentication code extracted thereby from the reply signal and the second authentication code generated by the code generator 21 thereof.

In this embodiment, the code generator 21 of the reader 2 generates the second authentication code based on a second varying value. Preferably, the second varying value is the date and time at which the reader 2 receives the reply signal. For example, when the reader 2 receives the reply signal on Jul. 15, 2008 at 11:07:16 am, the second varying value may be 20080715110716.

The reader 2 compares the difference between the first and second authentication codes obtained thereby, i.e., eight, with a predetermined index, e.g., ten. When the result of comparison indicates that the difference obtained thereby is less than the predetermined index, which is the case in this example, the reader 2 verifies the transponder 1 to be authentic. On the other hand, when the result of comparison indicates that the difference obtained thereby is greater than the predetermined index, the reader 2 identifies the transponder 1 to be a counterfeit.

In an alternative embodiment, the first varying value is the amount of a count, such as of a counter, at a time point when the code generator 21 of the reader 2 generates the first authentication code, and the second varying value is the amount of a count at a time point when the reader 2 receives the reply signal.

It is noted that when the transponder 1 is verified to be authentic by the reader 2, the unique identifier of the transponder 1 extracted by the reader 2 from the reply signal is forwarded by the reader 2 to an external computer (not shown). Otherwise, i.e., when the transponder 1 is identified by the reader 2 to be a counterfeit, the reply signal is simply ignored by the reader 2.

The external computer is operable to retrieve information, such as price or size, related to a product (not shown) on which the transponder 1 is attached based on the unique identifier of the transponder 1 forwarded thereto by the reader 2, in a manner well known in the art.

Figure 2A:
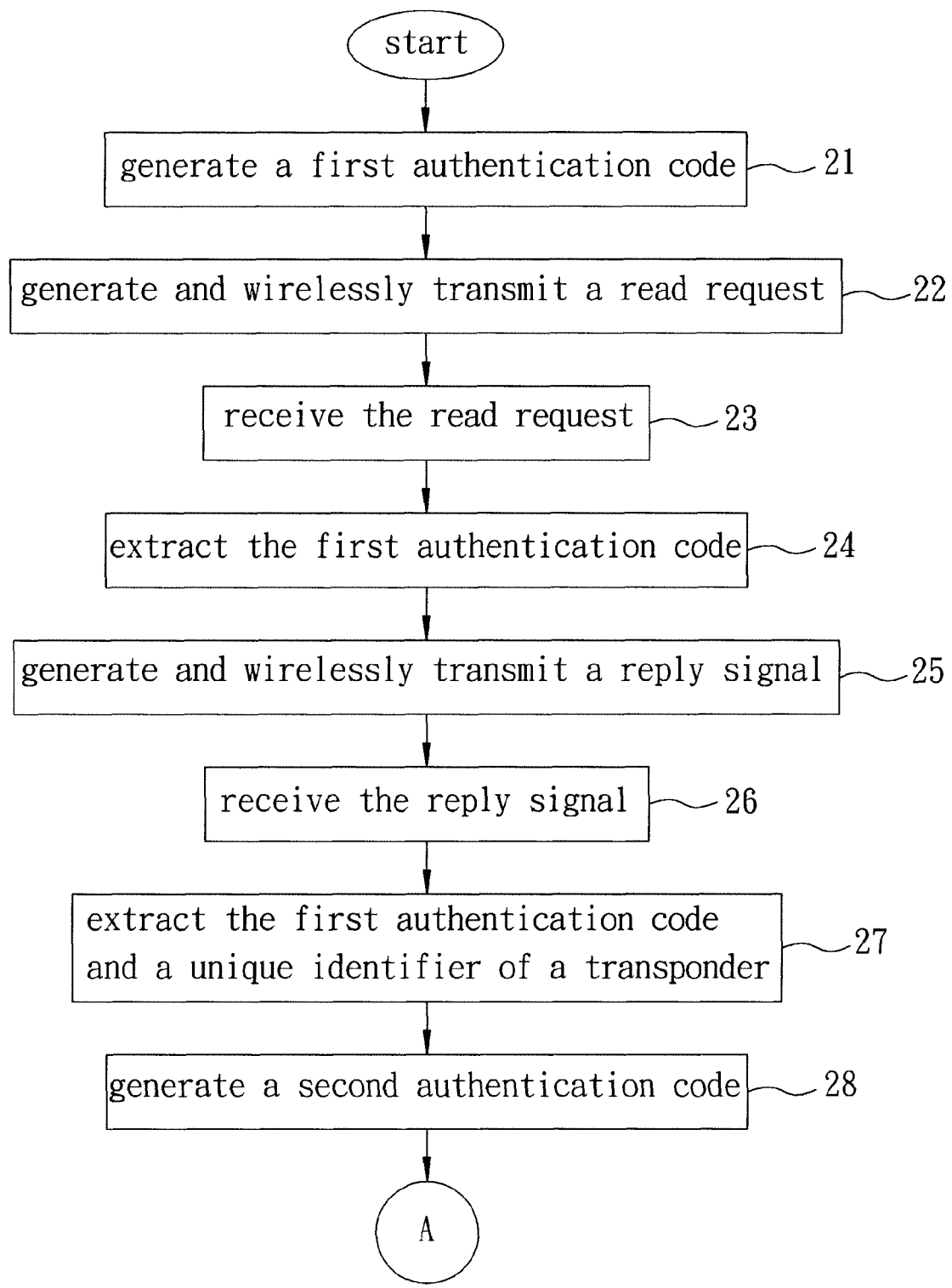
FIGS. 2A and 2B are flow charts of the first preferred embodiment of an authenticating method to be implemented using the identification system shown in FIG. 1 according to this invention.
Figure 2B:
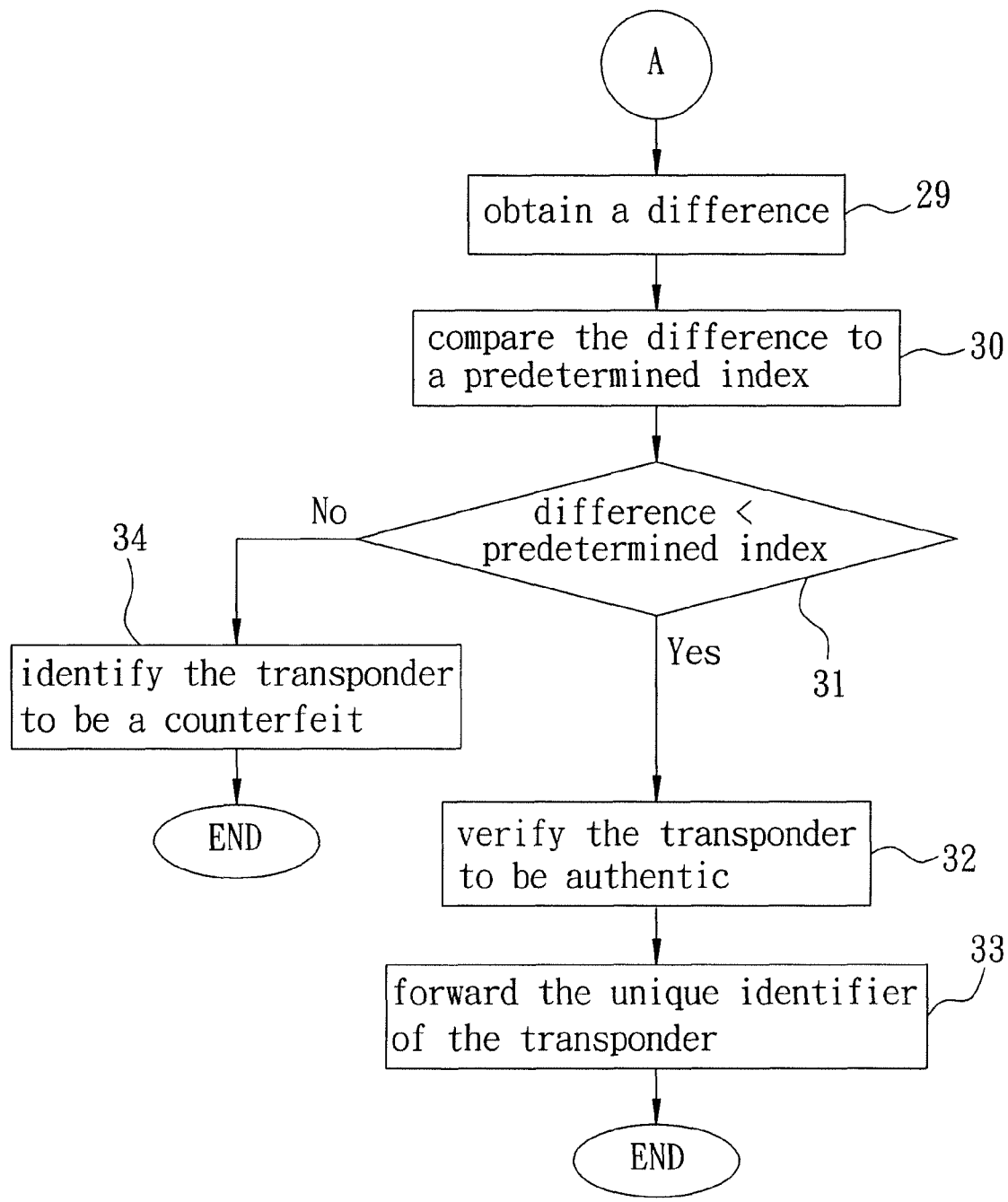

The first preferred embodiment of an authenticating method to be implemented using the aforementioned identification system according to this invention will now be described with further reference to FIGS. 2A and 2B.

In step 21, the code generator 21 of the reader 2 generates a first authentication code that is based on the first varying value.

In step 22, the reader 2 generates and wirelessly transmits a read request that contains the first authentication code.

In step 23, the transponder 1 receives the read request.

In step 24, the transponder 1 extracts the first authentication code from the read request.

In step 25, the transponder 1 generates and wirelessly transmits a reply signal that contains the first authentication code extracted thereby from the read request in step 24 and the unique identifier thereof.

In step 26, the reader 2 receives the reply signal.

In step 27, the reader 2 extracts the first authentication code and the unique identifier of the transponder 1 from the reply signal.

In step 28, the code generator 21 of the reader 2 generates a second authentication code based on the second varying value.

In step 29, the reader 2 obtains a difference between the first authentication code extracted thereby from the reply signal in step 27 and the second authentication code generated by the code generator 21 thereof in step 28.

In step 30, the reader 2 compares the difference obtained thereby in step 29 to the predetermined index.

In step 31, when the result of comparison in step 30 indicates that the difference obtained in step 29 is less than the predetermined index, the flow proceeds to step 32. Otherwise, when the result of comparison in step 30 indicates that the difference obtained in step 29 is greater than the predetermined index, the flow proceeds to step 34.

In step 32, the reader 2 verifies the transponder 1 to be authentic.

In step 33, the reader 2 forwards the unique identifier of the transponder 1 extracted thereby from the reply signal in step 27 to the external computer. Thereafter, the flow is terminated.

In step 34, the reader 2 identifies the transponder 1 to be a counterfeit. Thereafter, the flow is terminated.

Figure 3:
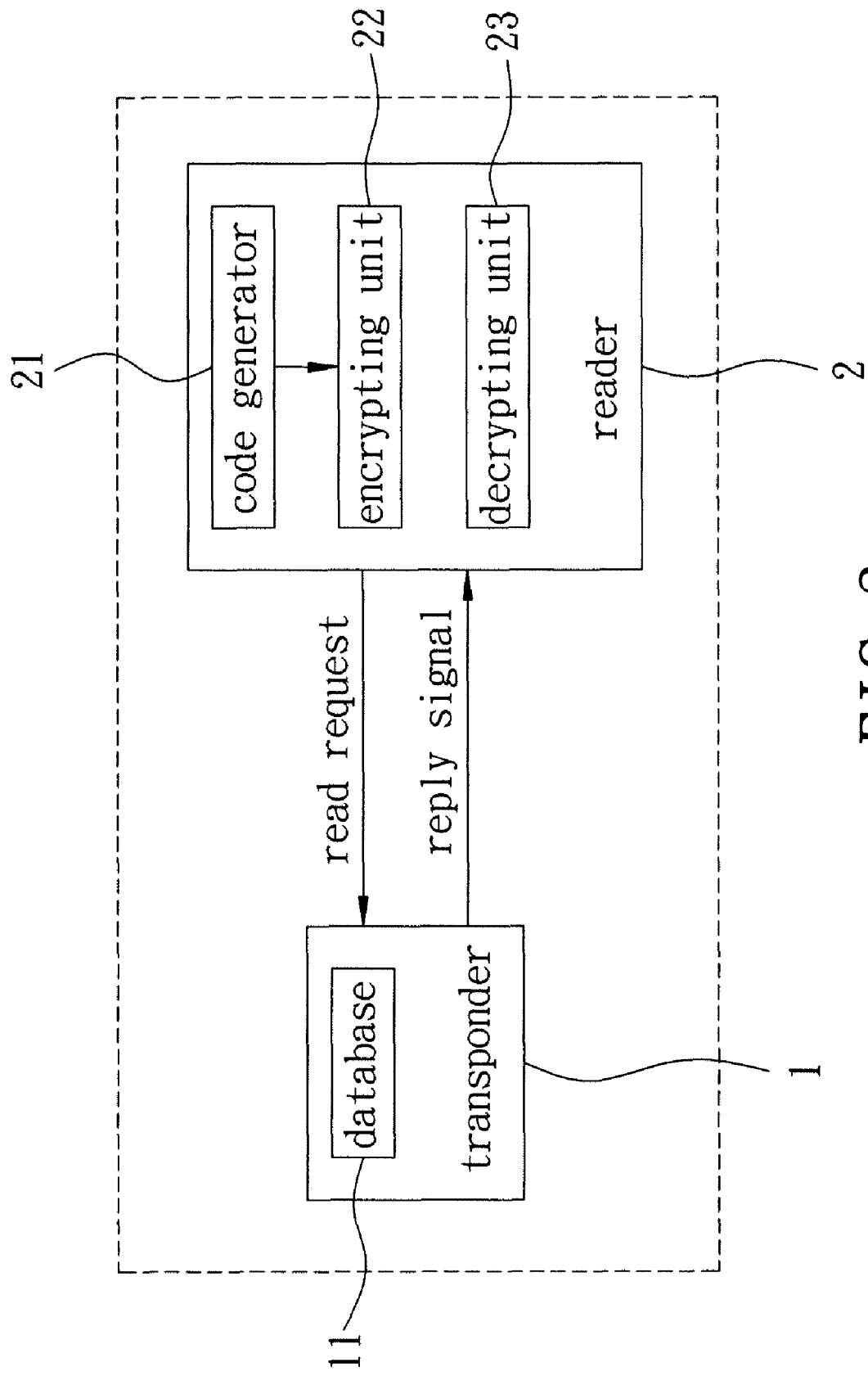
FIG. 3 is a block diagram of the second preferred embodiment of an identification system according to this invention.

FIG. 3 illustrates the second preferred embodiment of an identification system according to this invention. When compared to the previous embodiment, in this embodiment, the unique identifier of the transponder 1 stored in the database 11 is an encrypted unique identifier. The reader 2 further includes an encrypting unit 22 and a decrypting unit 23. The encrypting unit 22 is connected to the code generator 21 of the reader 2, and encrypts the first authentication code prior to the transmission of the read request. The decrypting unit 23 decrypts the first authentication code and the unique identifier of the transponder 1 extracted by the reader 2 from the reply signal.

Figure 4A:
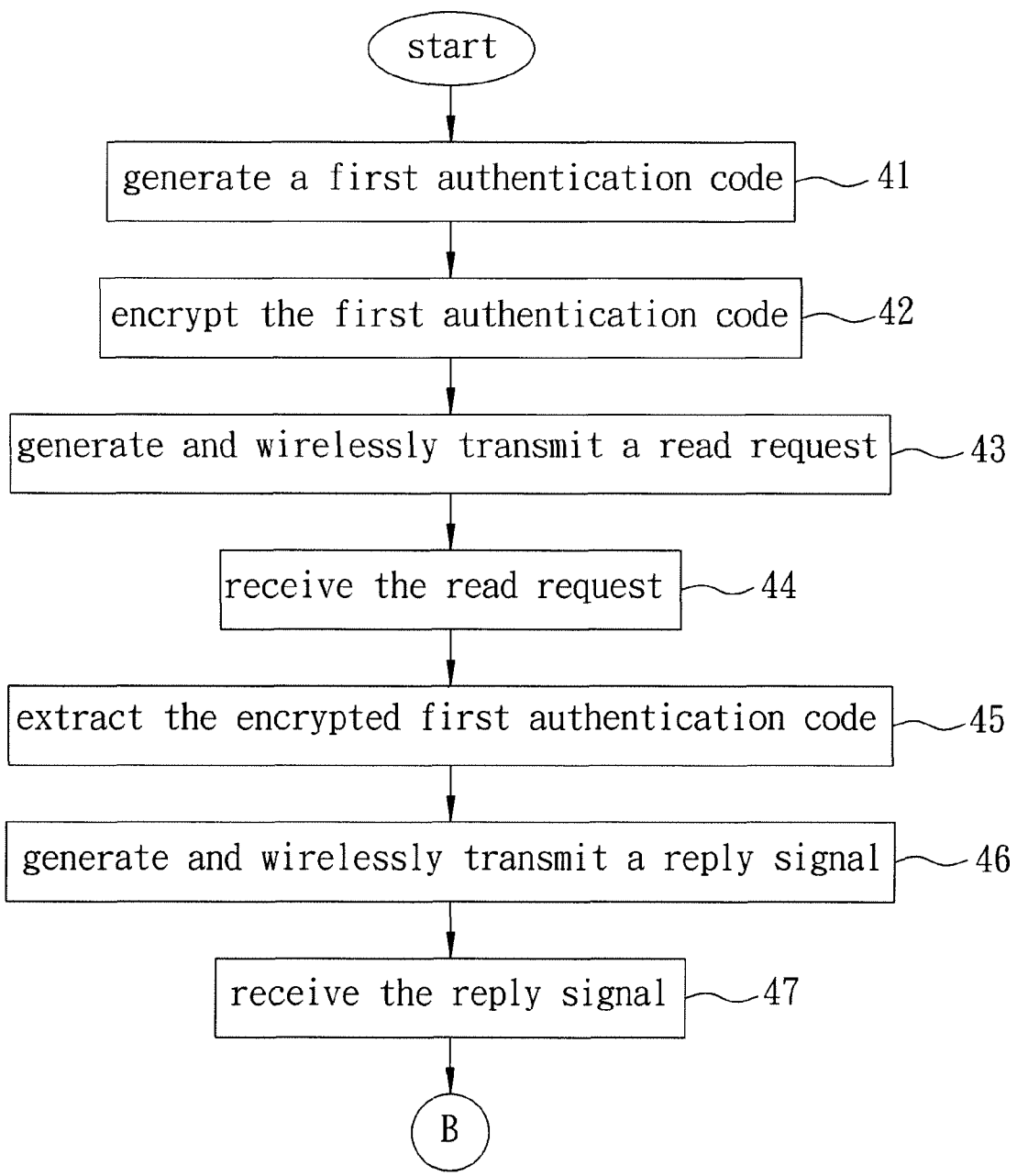
FIGS. 4A and 4B are flow charts of the second preferred embodiment of an authenticating method to be implemented using the identification system shown in FIG. 3 according to this invention.
Figure 4B:
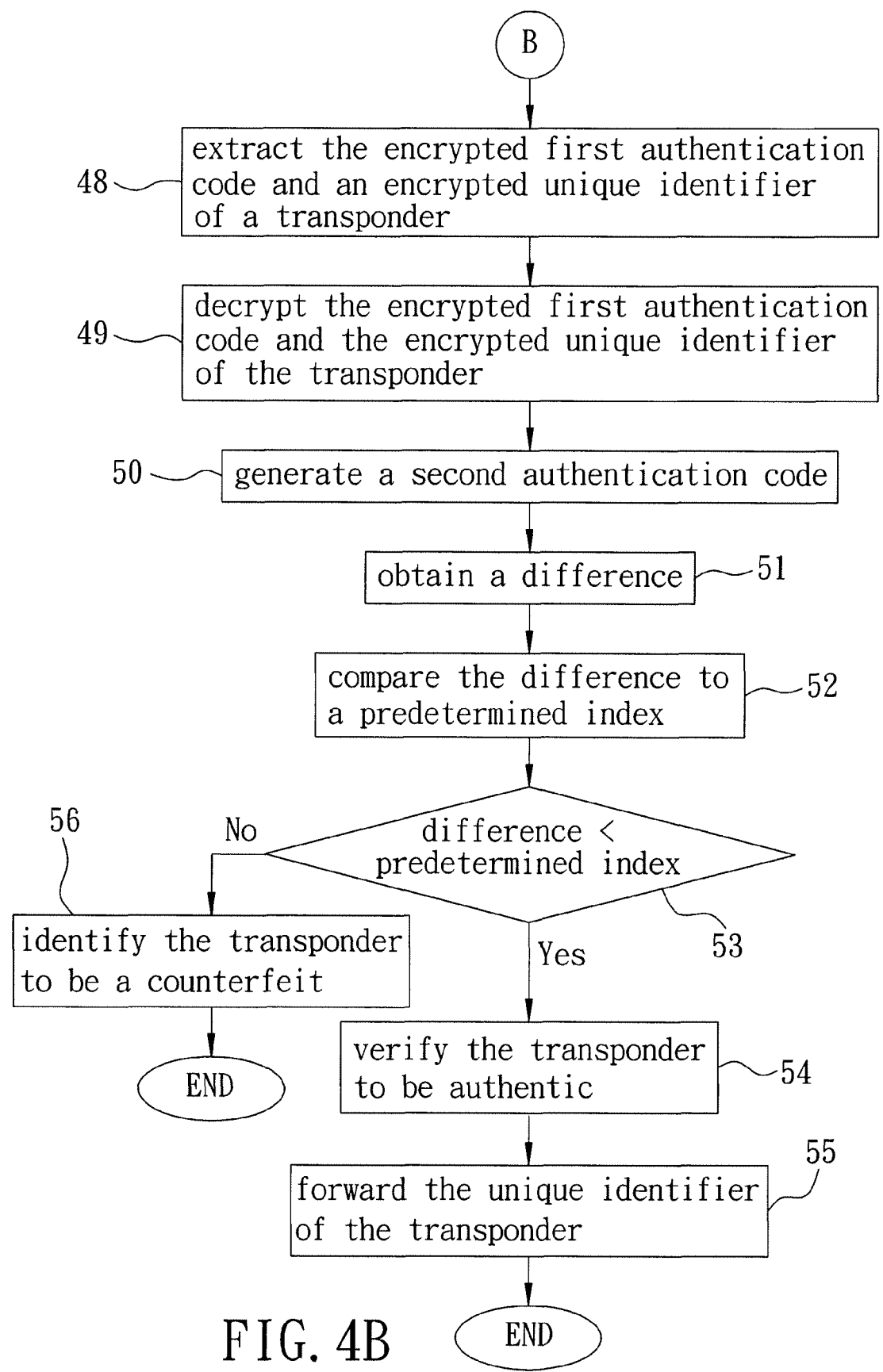

The second preferred embodiment of an authenticating method to be implemented using the aforementioned identification system according to this invention will now be described with further reference to FIGS. 4A and 4B.

In step 41, the code generator 21 of the reader 2 generates a first authentication code based on the first varying value.

In step 42, the encrypting unit 22 of the reader 2 encrypts the first authentication code to obtain an encrypted first authentication code.

In step 43, the reader 2 generates and wirelessly transmits a read request that contains the encrypted first authentication code obtained in step 42.

In step 44, the transponder 1 receives the read request.

In step 45, the transponder 1 extracts the encrypted first authentication code from the read request.

In step 46, the transponder 1 generates and wirelessly transmits a reply signal that contains the encrypted first authentication code extracted thereby from the read request in step 45 and the encrypted unique identifier thereof.

In step 47, the reader 2 receives the reply signal.

In step 48, the reader 2 extracts the encrypted first authentication code and the encrypted unique identifier of the transponder 1 from the reply signal.

In step 49, the decrypting unit 23 of the reader 2 decrypts the encrypted first authentication code and the encrypted unique identifier of the transponder 1 extracted by the reader 2 in step 48 to obtain the first authentication code and the unique identifier of the transponder 1.

In step 50, the code generator 21 of the reader 2 generates a second authentication code based on the second varying value.

In step 51, the reader 2 obtains a difference between the first authentication code obtained in step 49 and the second authentication code generated by the code generator 21 thereof in step 50.

In step 52, the reader 2 compares the difference obtained thereby in step 51 to the predetermined index.

In step 53, when the result of comparison in step 52 indicates that the difference obtained in step 51 is less than the predetermined index, the flow proceeds to step 54. Otherwise, when the result of comparison in step 52 indicates that the difference obtained in step 51 is greater than the predetermined index, the flow proceeds to step 56.

In step 54, the reader 2 verifies the transponder 1 to be authentic.

In step 55, the reader 2 forwards the unique identifier of the transponder 1 obtained in step 49 to the external computer. Thereafter, the flow is terminated.

In step 56, the reader 2 identifies the transponder 1 to be a counterfeit. Thereafter, the flow is terminated.

While the present invention has been described in connection with what are considered the most practical and preferred embodiments, it is understood that this invention is not limited to the disclosed embodiments but is intended to cover various arrangements included within the spirit and scope of the broadest interpretation so as to encompass all such modifications and equivalent arrangements.

What is claimed is:

1. An authenticating method, comprising:
   A) enabling a transponder to receive a read request that contains a first authentication code;
   B) enabling the transponder to extract the first authentication code from the read request;
   C) enabling the transponder to generate and wirelessly transmit a reply signal that contains the first authentication code extracted from the read request in step B), the transponder being authenticated based on the first authentication code contained in the reply signal transmitted; and D) enabling a reader to generate and wirelessly transmit the read request prior to step A), wherein, in this step D), the reader generates the first authentication code based on a first varying value, E) enabling the reader to receive the reply signal;

F) enabling the reader to extract the first authentication code from the reply signal;

G) enabling the reader to generate a second authentication code based on a second varying value;

H) enabling the reader to obtain a difference between the first authentication code extracted thereby from the reply signal in step F) and the second authentication code generated thereby in step G); and I) enabling the reader to authenticate the transponder based on the difference obtained thereby in step H).

2. The authenticating method as claimed in claim 1, wherein step I) includes the sub-steps of:

i1) comparing the difference obtained in step H) with a predetermined index;

i2) if the comparing in sub-step i1) indicates that the difference obtained in step H) is less than the predetermined index, verifying the transponder to be authentic; and i3) if the result of comparison comparing in sub-step i1) indicates that the difference obtained in step H) is greater than the predetermined index, identifying the transponder to be a counterfeit.

3. The authenticating method as claimed in claim 1, wherein the transponder has a unique identifier, the reply signal generated by the transponder in step C) further contains the unique identifier of the transponder, and step F) includes the sub-step of enabling the reader to extract the unique identifier of the transponder from the reply signal.

4. The authenticating method as claimed in claim 3, wherein step F) further includes the sub-step of enabling the reader to decrypt the unique identifier of the transponder extracted from the reply signal.

5. The authenticating method as claimed in claim 1, wherein step D) includes the sub-step of enabling the reader to encrypt the first authentication code prior to the transmission of the read request, and step F) includes the sub-step of enabling the reader to decrypt the first authentication code extracted from the reply signal.

6. The authenticating method as claimed in claim 1, wherein the transponder comprises a radio frequency identification (RFID) tag.

7. An identification system, comprising:

a transponder configured to receive a read request that contains a first authentication code, extracting the first authentication code from the read request, and to generate and wirelessly transmit a reply signal that contains the first authentication code extracted from the read request, said transponder being authenticated based on the first authentication code contained in the reply signal transmitted; and a reader configured to generate and wirelessly transmit the read request, wherein the reader includes a code generator configured to generate the first authentication code based on a first varying value, and a second authentication code based on a second varying value, and wherein reader is further configured to receive the reply signal, extract the first authentication code from the reply signal, obtain a difference between the first authentication code extracted from the reply signal and the second authentication code generated by the code generator thereof, and authenticate the transponder based on the difference.

8. The identification system as claimed in claim 7, wherein the reader is configured to compare the difference with a predetermined index, verify the transponder to be authentic if the comparing indicates that the difference is less than the predetermined index, and identify the transponder to be a counterfeit if the comparing indicates that the difference is greater than the predetermined index.

9. The identification system as claimed in claim 7, wherein said transponder has a unique identifier, the reply signal generated by said transponder further contains the unique identifier of said transponder, and said reader is further configured to extract the unique identifier of said transponder from the reply signal.

10. The identification system as claimed in claim 9, wherein said reader further includes a decrypting unit configured to decrypt the unique identifier of said transponder extracted from the reply signal.

11. The identification system as claimed in claim 7, wherein said reader further includes:

an encrypting unit coupled to said code generator of said reader, and configured to encrypt the first authentication code contained in the read request prior to the transmission thereof; and a decrypting unit configured to encrypt the first authentication code extracted from the reply signal.

12. The identification system as claimed in claim 7, wherein said transponder comprises a radio frequency identification (RFID) tag.

* * * * *